(12) United States Patent
Watanabe et al.

(10) Patent No.: US 11,156,272 B2
(45) Date of Patent: Oct. 26, 2021

(54) CHAIN TENSIONER

(71) Applicant: TSUBAKIMOTO CHAIN CO., Osaka (JP)

(72) Inventors: Masanori Watanabe, Osaka (JP); Osamu Yoshida, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 361 days.

(21) Appl. No.: 16/263,696

(22) Filed: Jan. 31, 2019

(65) Prior Publication Data
US 2019/0242461 A1  Aug. 8, 2019

(30) Foreign Application Priority Data
Feb. 5, 2018  (JP) .............................. JP2018-018064

(51) Int. Cl.
*F16H 7/08*  (2006.01)

(52) U.S. Cl.
CPC .......... *F16H 7/0836* (2013.01); *F16H 7/0848* (2013.01); *F16H 2007/0806* (2013.01); *F16H 2007/0812* (2013.01); *F16H 2007/0859* (2013.01)

(58) Field of Classification Search
CPC ........ F16H 7/08; F16H 7/0836; F16H 7/0848; F16H 2007/0806; F16H 2007/0812; F16H 2007/0814; F16H 2007/0842; F16H 2007/0859; F16H 2007/0882; F16H 2007/0891; F16H 2007/0893
See application file for complete search history.

(56) References Cited

U.S. PATENT DOCUMENTS

2011/0256970 A1  10/2011  Nakano et al.
2012/0202629 A1  8/2012  O'Shea

FOREIGN PATENT DOCUMENTS

| JP | H07-35203 A | 2/1995 |
| JP | 2007-321899 A | 12/2007 |
| JP | 2011-226534 A | 11/2011 |
| JP | 2013-504723 A | 2/2013 |

OTHER PUBLICATIONS

Machine Translation of JPH 0735203A. (Year: dated 1995).*
Machine Translation of JP 2007321899A. (Year: dated 2007).*
Office Action dated Jul. 6, 2021, issued in counterpart JP Application No. 2018-018064, with English Translation. (6 pages).

* cited by examiner

*Primary Examiner* — Michael R Mansen
*Assistant Examiner* — Juan J Campos, Jr.
(74) *Attorney, Agent, or Firm* — Westerman, Hattori, Daniels & Adrian, LLP

(57) ABSTRACT

The present invention provides a chain tensioner that automatically adjusts flow path resistance inside an oil leak path with a simple configuration to make it possible to reduce a change in damping characteristics resulting from a change in oil temperature and reduce an increase in manufacturing cost. In the chain tensioner, a pressure oil chamber is provided with an oil leak path communicating with an outside of the chain tensioner, the oil leak path contains a movable piece which is movable with a temperature-dependent deformation member that deforms according to oil temperature, and the movable piece is formed into a shape that changes flow path resistance of the oil leak path according to a position to which the movable piece is moved.

4 Claims, 8 Drawing Sheets

A-PART ENLARGED VIEW

A-PART ENLARGED VIEW

CHAIN TENSIONER

BACKGROUND OF THE INVENTION

1. Field of the Invention

The present invention relates to a chain tensioner including: a tensioner body having a cylindrical plunger accommodation hole with its one end open; a cylindrical plunger slidably inserted into the plunger accommodation hole; and urging means flexibly accommodated in a pressure oil chamber formed by the plunger accommodation hole and the plunger and urging the plunger in a forward projection direction.

2. Description of the Related Art

Conventionally, chain tensioners that appropriately maintain the tension of chains have been ordinarily used. For example, in a chain guide mechanism that performs the sliding guide of a transmission chain such as a roller chain endlessly suspended and wound between sprockets provided at a crankshaft and a camshaft inside an engine room with a traveling guide shoe, a chain tensioner that urges an oscillating chain guide having the traveling guide shoe to appropriately maintain tension has been known as such.

For example, as shown in FIG. 7, a chain guide mechanism is so configured that a timing chain CH is endlessly suspended and wound between a driving sprocket S1 attached at a crankshaft and a pair of driven sprockets S2 and S3 attached at a camshaft inside an engine room, and that the timing chain CH is guided by an oscillating chain guide G1 and a fixed chain guide G2.

The fixed chain guide G2 is fixed inside the engine room by two attachment shafts B1 and B2, and the oscillating chain guide G1 is attached inside the engine room to be capable of oscillating in the suspended and wound plane of the timing chain CH about an attachment shaft B0.

A chain tensioner 500 presses the oscillating chain guide G1 to appropriately maintain the tension of the timing chain CH and prevent the vibration of the timing chain CH.

As schematically shown in, for example, FIG. 8, the known chain tensioner 500 used in such a chain guide mechanism includes: a tensioner body 510 having a cylindrical plunger accommodation hole 511 with its one end open; a cylindrical plunger 520 slidably inserted into a cylinder surface part 513 of the plunger accommodation hole 511; and urging means for urging the plunger 520 from the plunger accommodation hole 511 to a forward side representing its projection direction.

The urging means is constituted by a coil spring 540 accommodated in a cylindrical concave section 521 of the cylindrical plunger 520 and compressed between the plunger 520 and a bottom 512 of the plunger accommodation hole 511.

When oil is supplied from an oil supply hole 514 provided on the plunger accommodation hole 511, a pressure oil chamber 501 formed between the plunger accommodation hole 511 and the plunger 520 is filled with the oil. The plunger 520 is urged in the projection direction by the oil, and the outflow of the oil from the oil supply hole 514 is blocked by a check valve 550 (only a check ball is schematically shown).

Thus, the oil flows through the slight gap between the plunger 520 and the plunger accommodation hole 511 as the plunger 520 reciprocates, and the oil produces a flow path resistance to cause a damping effect in which the reciprocation of the plunger 520 attenuates is obtained.

When an excessive tensile force is generated in a timing chain in use in such a chain tensioner, the pressure inside a pressure oil chamber becomes excessive. Therefore, there is a likelihood that noise or vibration occurs or the timing chain is damaged.

In order to prevent such an event, chain tensioners including a relief path to which prescribed flow path resistance for preventing the pressure inside a pressure oil chamber from being greater than prescribed pressure is given have been known. In addition, a chain tensioner in which flow path resistance is made variable has been known in Japanese Patent Application Laid-open No. 2011-226534 or the like.

SUMMARY OF THE INVENTION

However, there has been yet room for improvement in the chain tensioners known in Japanese Patent Application Laid-open No. 2011-226534 and the like.

That is, in the chain tensioner known in Japanese Patent Application Laid-open No. 2011-226534, the opening of an opening adjustment valve is manually or automatically changed to adjust the flow rate of high-pressure oil passing through an oil leak path without separately applying different processing to adjust damping characteristics even when a different engine or different operation conditions are used. However, under the same engine or the same operation conditions, it is difficult to manually dynamically address a change in the viscosity of high-pressure oil resulting from a change in oil temperature during the operation of an engine. Even if the change in the viscosity of the high-pressure oil is automatically dynamically adjusted, adjustment accompanying control by a controller is required. Therefore, there is a likelihood that a device configuration is complicated and upsized or manufacturing cost is increased.

The present invention has been made in order to solve the above problems and has an object of providing a chain tensioner that automatically adjusts flow path resistance inside an oil leak path with a simple configuration to make it possible to reduce a change in damping characteristics resulting from a change in oil temperature and reduce an increase in manufacturing cost.

In order to solve the above problems, the present invention provides a chain tensioner including: a tensioner body having a cylindrical plunger accommodation hole and having an opening at one end; a cylindrical plunger slidably inserted into the plunger accommodation hole; and an urging unit flexibly accommodated in a pressure oil chamber formed by the plunger accommodation hole and the plunger and urging the plunger in a forward projection direction, wherein the pressure oil chamber is provided with an oil leak path communicating with an outside of the chain tensioner, the oil leak path contains a movable piece which is movable with a temperature-dependent deformation member that deforms according to oil temperature, and the movable piece is formed into a shape that changes flow path resistance of the oil leak path according to a position to which the movable piece is moved.

According to an aspect of the present invention, the oil leak path provided in the pressure oil chamber has the movable piece which is movable with the temperature-dependent deformation member that deforms according to oil temperature, and the movable piece is formed into the shape that changes the flow path resistance of the oil leak path according to a position to which the movable piece is moved. Therefore, even if the viscosity of oil changes with oil temperature, it is possible to secure the leak amount of the oil and prevent a change in damping effect.

Further, a device accompanying electric control such as a sensor and a controller is not required to move the movable piece, and the movable piece is movable with the temperature-dependent deformation member that deforms according to oil temperature. Therefore, it is possible to simplify a device configuration and further reduce cost for manufacturing or maintenance compared with a case in which a device accompanying electric control such as a sensor and a controller is used.

According to another aspect of the present invention, the movable piece is accommodated to be slidable inside a movable piece passage hole provided to cross the oil leak path, and the temperature-dependent deformation member is inserted inside the movable piece passage hole on at least one side of the movable piece. Therefore, it is possible to change the flow path resistance of the oil leak path only by advancing/retracting the movable piece inside the movable piece passage hole with the deformation of the temperature-dependent deformation member.

Further, since the movable piece passage hole is provided to cross the oil leak path, the movable piece is prevented from advancing/retracting with the pressure of oil. Therefore, it is possible to further secure an oil leak amount.

According to another aspect of the present invention, the oil leak path is provided in the tensioner body and formed to communicate with the outside of the chain tensioner from the plunger accommodation hole. Therefore, it is possible to simplify the device configuration of the chain tensioner and easily replace or adjust the movable piece or the temperature-dependent deformation member even after attaching the chain tensioner to an engine block.

According to another aspect of the present invention, the oil leak path is provided on a forward side of the plunger and formed to communicate with the outside of the chain tensioner from an inside of the plunger. Therefore, it is possible to miniaturize the tensioner body and directly add the oil leaking from the plunger to the side of a shoe to be effectively used to smoothen a chain.

DESCRIPTION OF THE PREFERRED EMBODIMENTS

Hereinafter, a chain tensioner 100 according to an embodiment of the present invention will be described based on the drawings.

Figure 1:
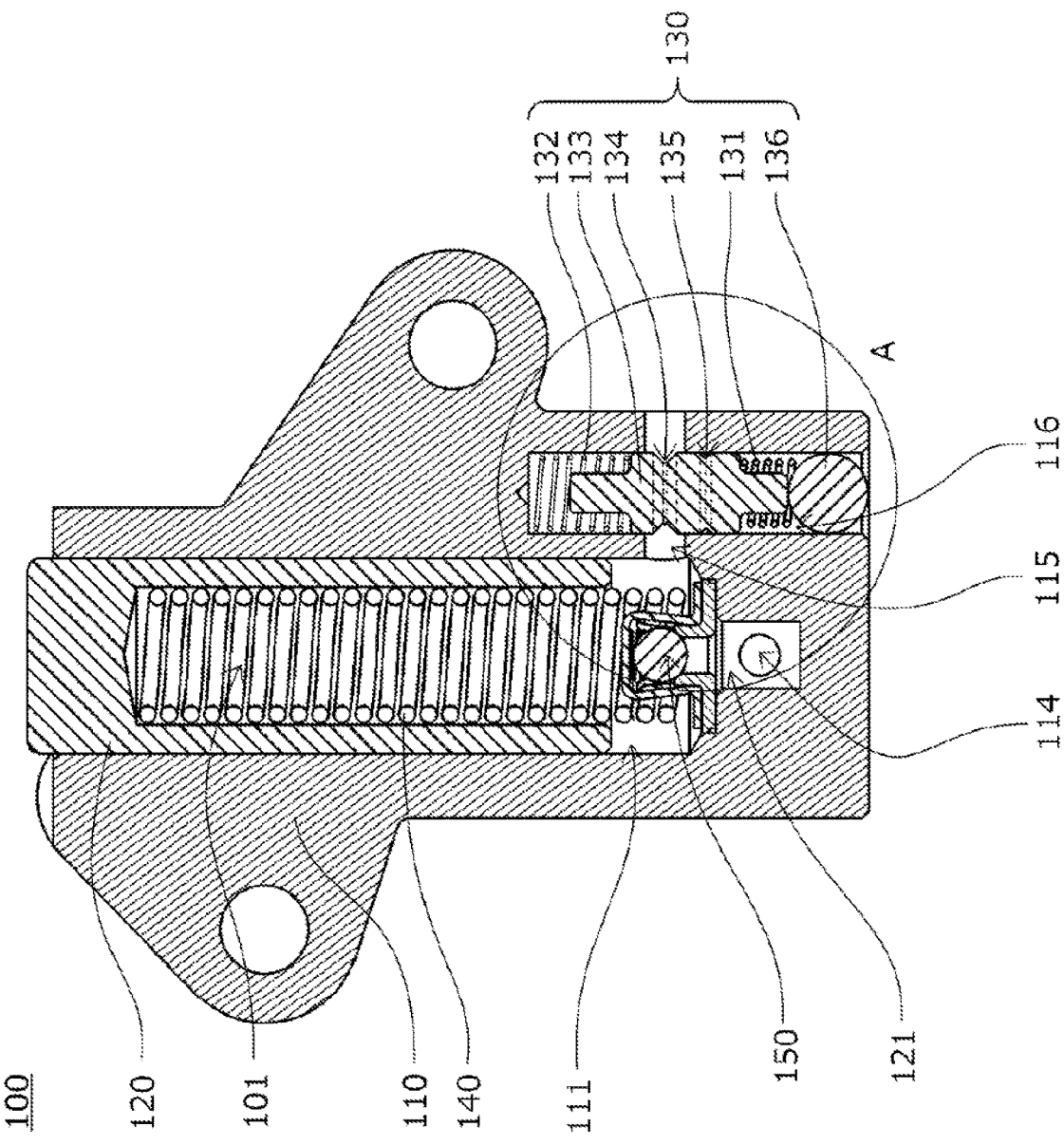
FIG. 1 is a front cross-sectional view of a chain tensioner 100 according to one embodiment of the present invention.

As shown in FIG. 1, a chain tensioner 100 includes: a tensioner body 110 having a cylindrical plunger accommodation hole 111 with its one end open; a cylindrical plunger 120 slidably inserted into the plunger accommodation hole 111; and a coil spring 140 flexibly accommodated in a pressure oil chamber 101 formed by the plunger accommodation hole 111 and the plunger 120 and urging the plunger 120 in a forward projection direction. An oil leak path 115 communicating with the outside of the chain tensioner 100 and an oil storage chamber 121 communicating with an oil supply hole 114 for supplying oil are connected to the pressure oil chamber 101. A movable piece passage hole 116 including a variable leak-down mechanism 130 is connected to the oil leak path 115 so as to cross the oil leak path 115.

Since the oil leak path 115 is provided in the tensioner body 110 as described above, it is possible to simplify the device configuration of the chain tensioner 100 and replace or adjust a movable piece 133 or a temperature-dependent deformation member 131 even after the chain tensioner 100 is attached to an engine block.

Between the pressure oil chamber 101 and the oil storage chamber 121, a check valve unit 150 preventing oil flowing into the pressure oil chamber 101 from flowing back to the oil storage chamber 121 is provided.

The variable leak-down mechanism 130 is constituted by the movable piece 133, a movable spring 132 urging the movable piece 133 in the opening direction of the movable piece passage hole 116, the temperature-dependent deformation member 131 urging the movable piece 133 to the side of the movable spring 132, and a plug 136 blocking the movable piece passage hole 116. On the surface of the movable piece 133, a first leak groove 134 formed into a circumferential shape and a second leak groove 135 having a groove shape different from that of the first leak groove 134 are provided.

Figure 2:
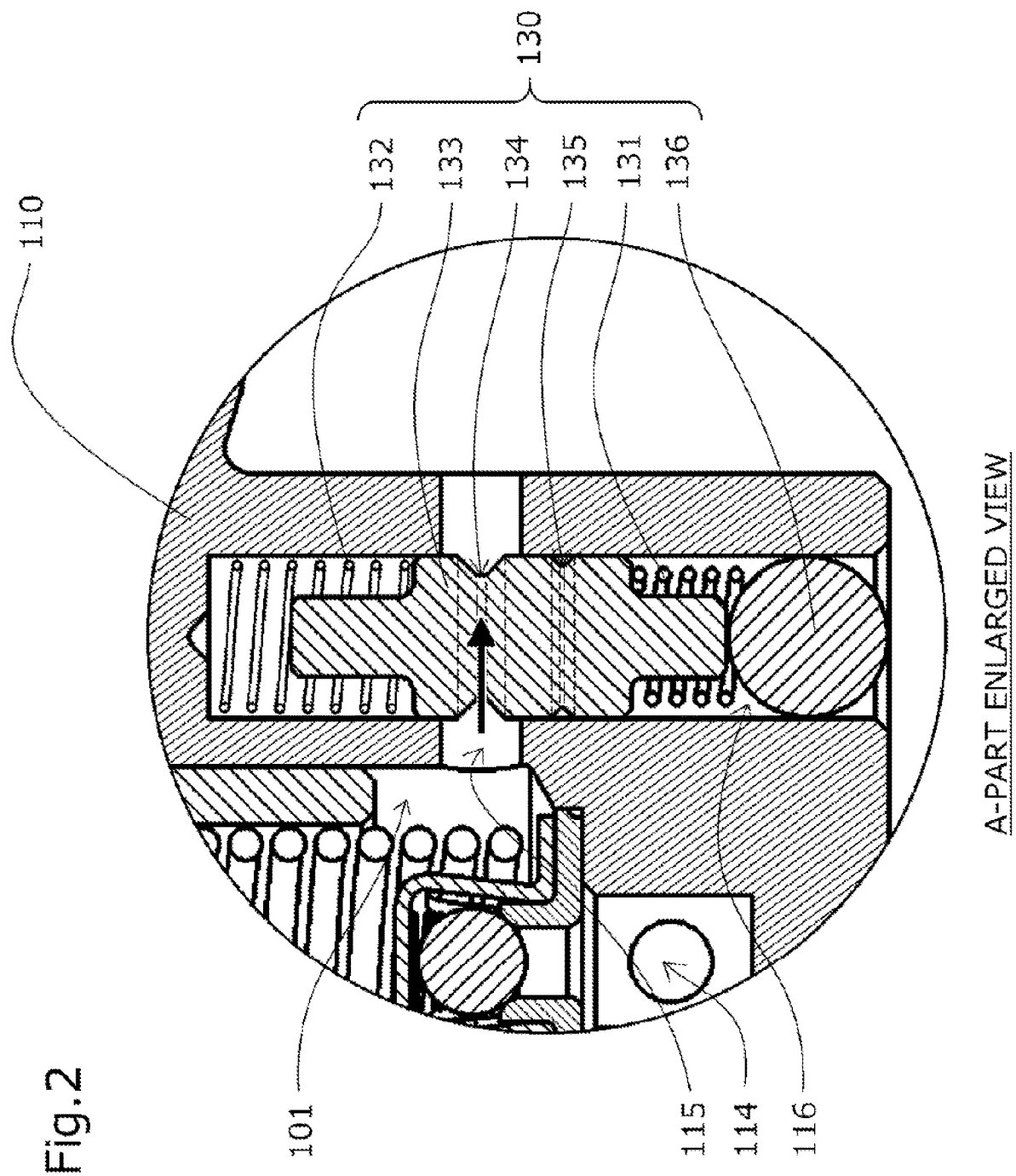
FIG. 2 is an A-part enlarged view of the chain tensioner 100 according to one embodiment of the present invention.
Figure 3:
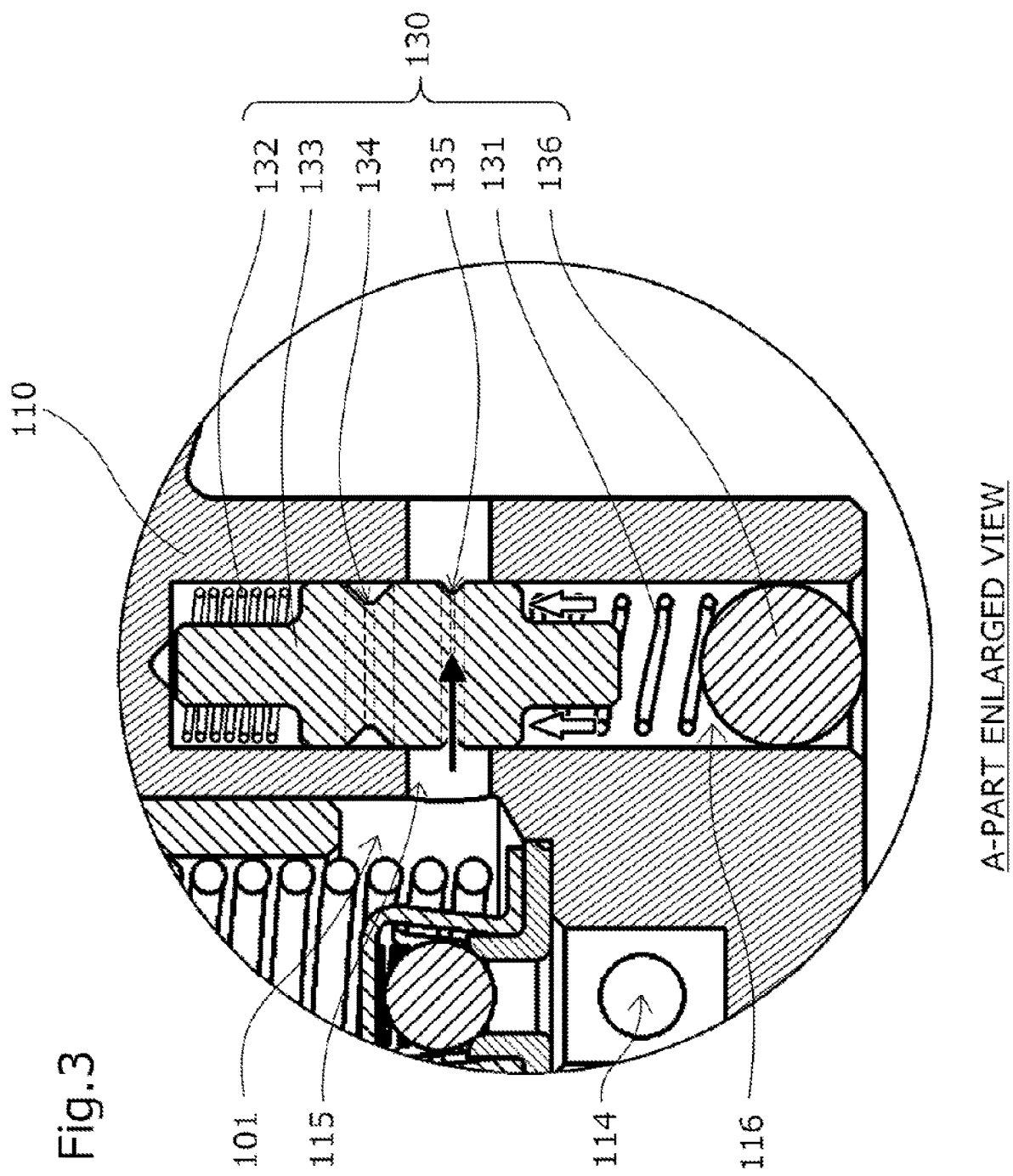
FIG. 3 is the A-part enlarged view showing a state in which a temperature-dependent deformation member 131 of the chain tensioner 100 according to one embodiment of the present invention operates.

Next, the operation of the variable leak-down mechanism 130 of the chain tensioner 100 will be described using FIGS. 2 and 3.

First, by the damping of the plunger 120, oil is subjected to a force in a direction in which the oil is pushed out from the oil leak path 115 to the outside of the tensioner body 110.

On this occasion, since the flow path of the oil leak path 115 is narrowed down by the first leak groove 134 of the movable piece 133, it is possible to adjust the leak amount of the oil and maintain proper damping characteristics.

Here, when the viscosity of the oil changes with a change in oil temperature, the proper damping characteristics may not be obtained due to the excessive leak of the oil if the flow path inside the oil leak path 115 is narrowed down in the same manner as that before the oil temperature changes. However, the temperature-dependent deformation member 131 of the variable leak-down mechanism 130 extends to its prescribed length with a change in the oil temperature to push the movable piece 133 to the side of the movable spring 132, and the second leak groove 135 having a flow path narrower than that of the first leak groove 134 is moved to communicate with the oil leak path 115. In this manner, it is possible to reduce the leak amount of the oil and obtain the proper damping characteristics the same as that before the temperature changes.

Note that when the oil temperature returns to its initial temperature, the temperature-dependent deformation member 131 also contracts to its initial length. In addition, since the movable piece 133 is urged to the side of the temperature-dependent deformation member 131 by the movable spring 132, the movable piece 133 returns to its initial position to make the first leak groove 134 communicate with the oil leak path 115 again.

Further, since the use of a plurality of temperature-dependent deformation members each having a different deformation temperature allows leak grooves at three or more positions to be automatically selected according to the oil temperature with a simple configuration, it is possible to further prevent a change in the damping characteristics.

Next, a chain tensioner 200 according to another embodiment of the present invention will be described based on the drawings.

Figure 4:
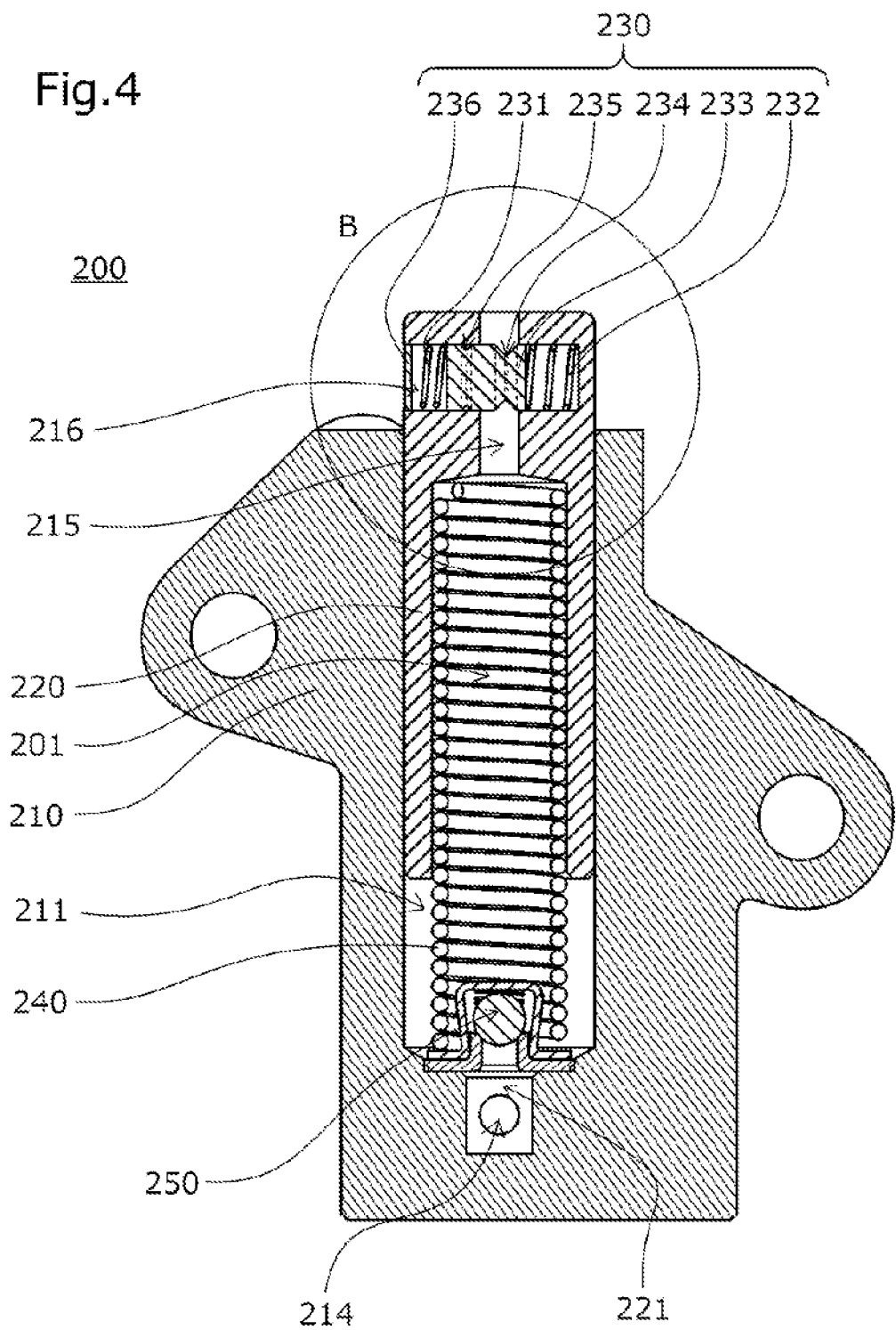
FIG. 4 is a front cross-sectional view of a chain tensioner 200 according to one embodiment of the present invention in which a variable leak-down mechanism 230 is provided in a plunger 220.

As shown in FIG. 4, a chain tensioner 200 includes: a tensioner body 210 having a cylindrical plunger accommodation hole 211 with its one end open; a cylindrical plunger 220 slidably inserted into the plunger accommodation hole 211; and a coil spring 240 flexibly accommodated in a pressure oil chamber 201 formed by the plunger accommodation hole 211 and the plunger 220 and urging the plunger 220 in a forward projection direction. An oil leak path 215 provided on the side of the tip end of the plunger 220 and communicating with the outside of the chain tensioner 200 and an oil storage chamber 221 communicating with an oil supply hole 214 for supplying oil are connected to the pressure oil chamber 201. A movable piece passage hole 216 including a variable leak-down mechanism 230 is connected to the oil leak path 215 so as to cross the oil leak path 215.

Since the oil leak path 215 is provided on the side of the tip end of the plunger 220 in the chain tensioner 200 as described above, it is possible to further miniaturize the tensioner body 210 and facilitate the provision of the chain tensioner 200 in narrow space.

Between the pressure oil chamber 201 and the oil storage chamber 221, a check valve unit 250 preventing oil flowing into the pressure oil chamber 201 from flowing back to the oil storage chamber 221 is provided.

The variable leak-down mechanism 230 is constituted by a movable piece 233, a movable spring 232 urging the movable piece 233 in the opening direction of a movable piece passage hole 216, a temperature-dependent deformation member 231 urging the movable piece 233 to the side of the movable spring 232, and a plug 236 blocking the movable piece passage hole 216. On the surface of the movable piece 233, a first leak groove 234 formed into a circumferential shape and a second leak groove 235 having a groove shape different from that of the first leak groove 234 are provided.

Figure 5:
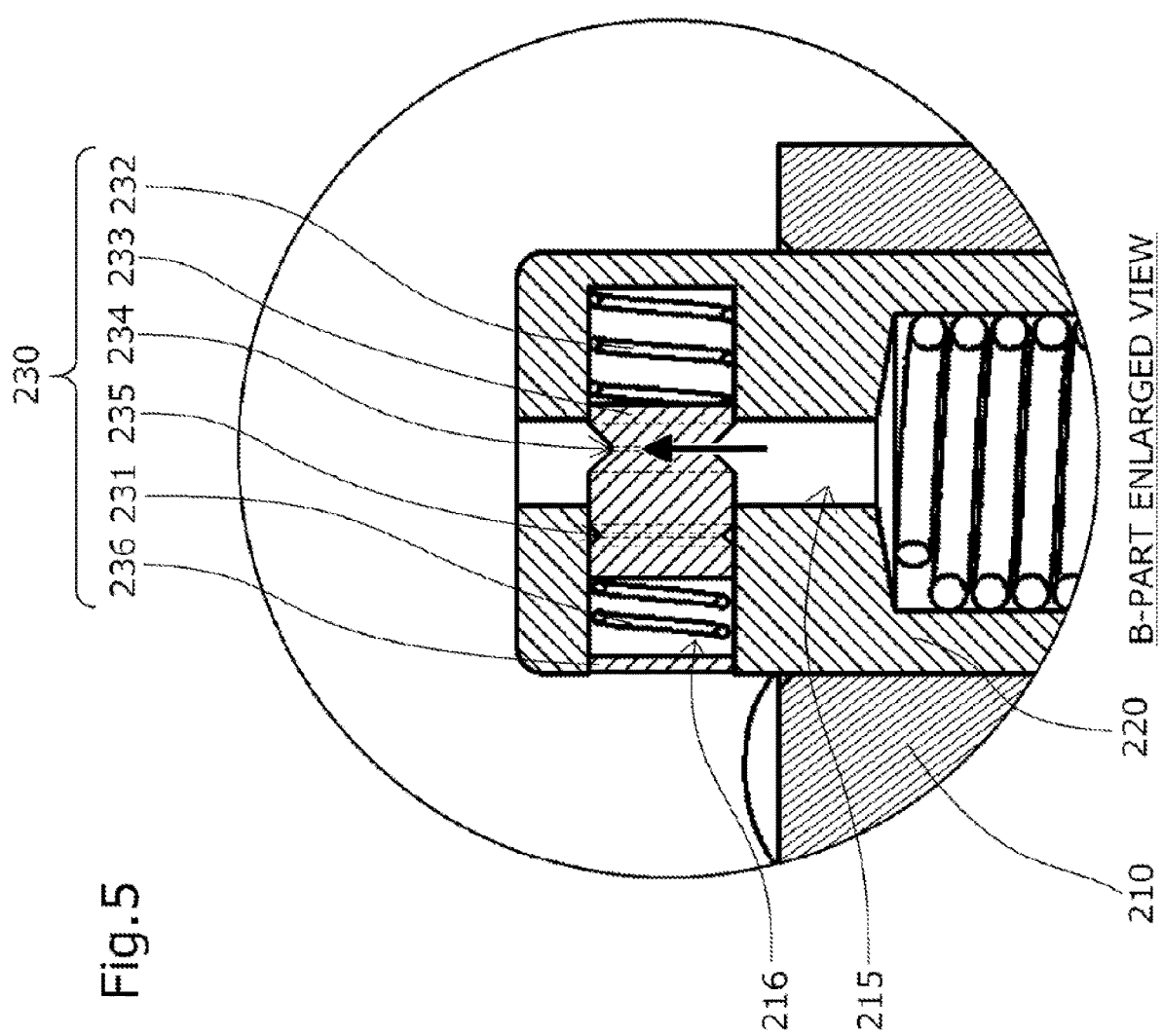
FIG. 5 is a B-part enlarged view of the chain tensioner 200 according to one embodiment of the present invention.
Figure 6:
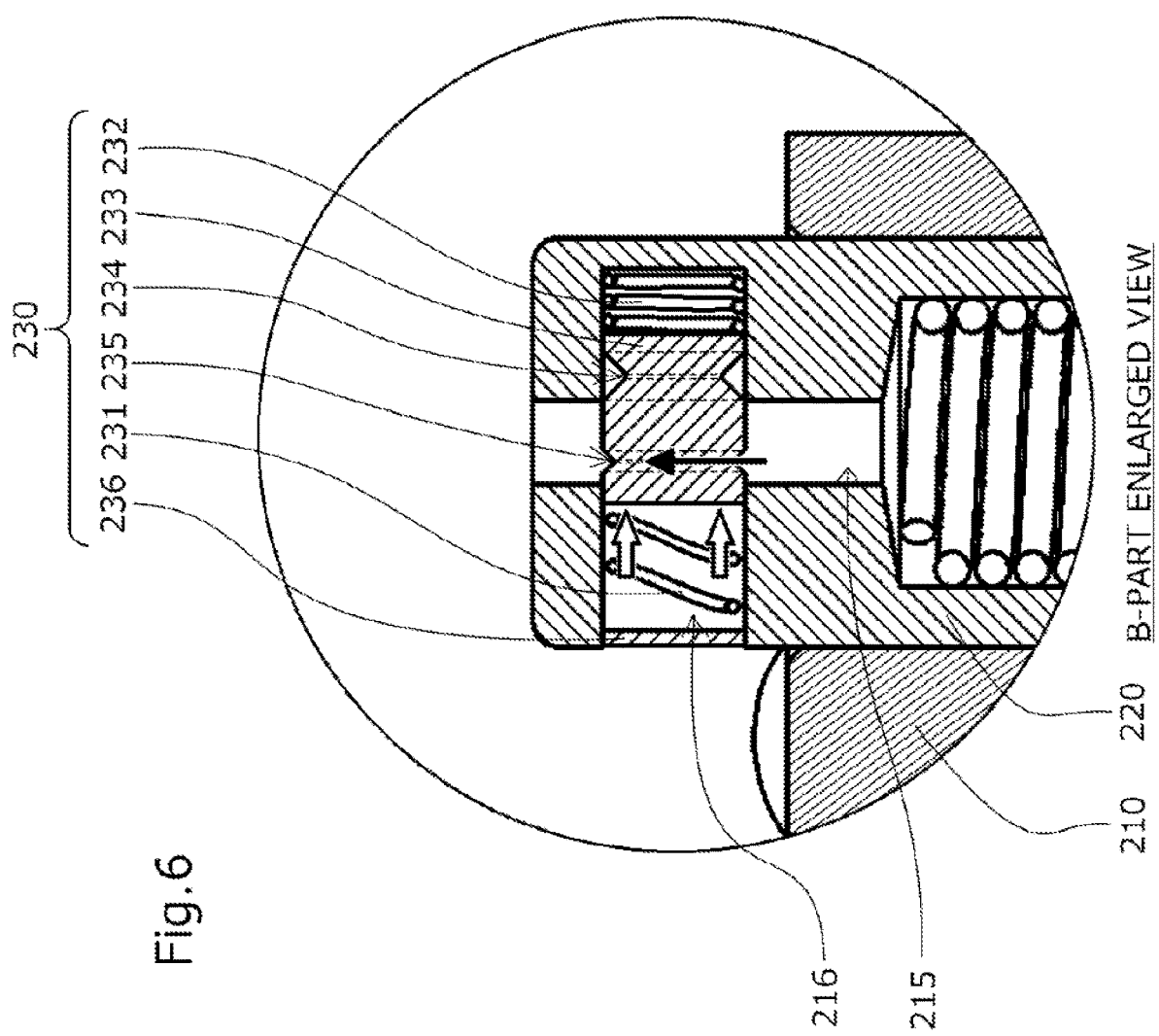
FIG. 6 is a B-part enlarged view of the chain tensioner 200 according to one embodiment of the present invention in which a temperature-dependent deformation member 231 operates.
Figure 7:
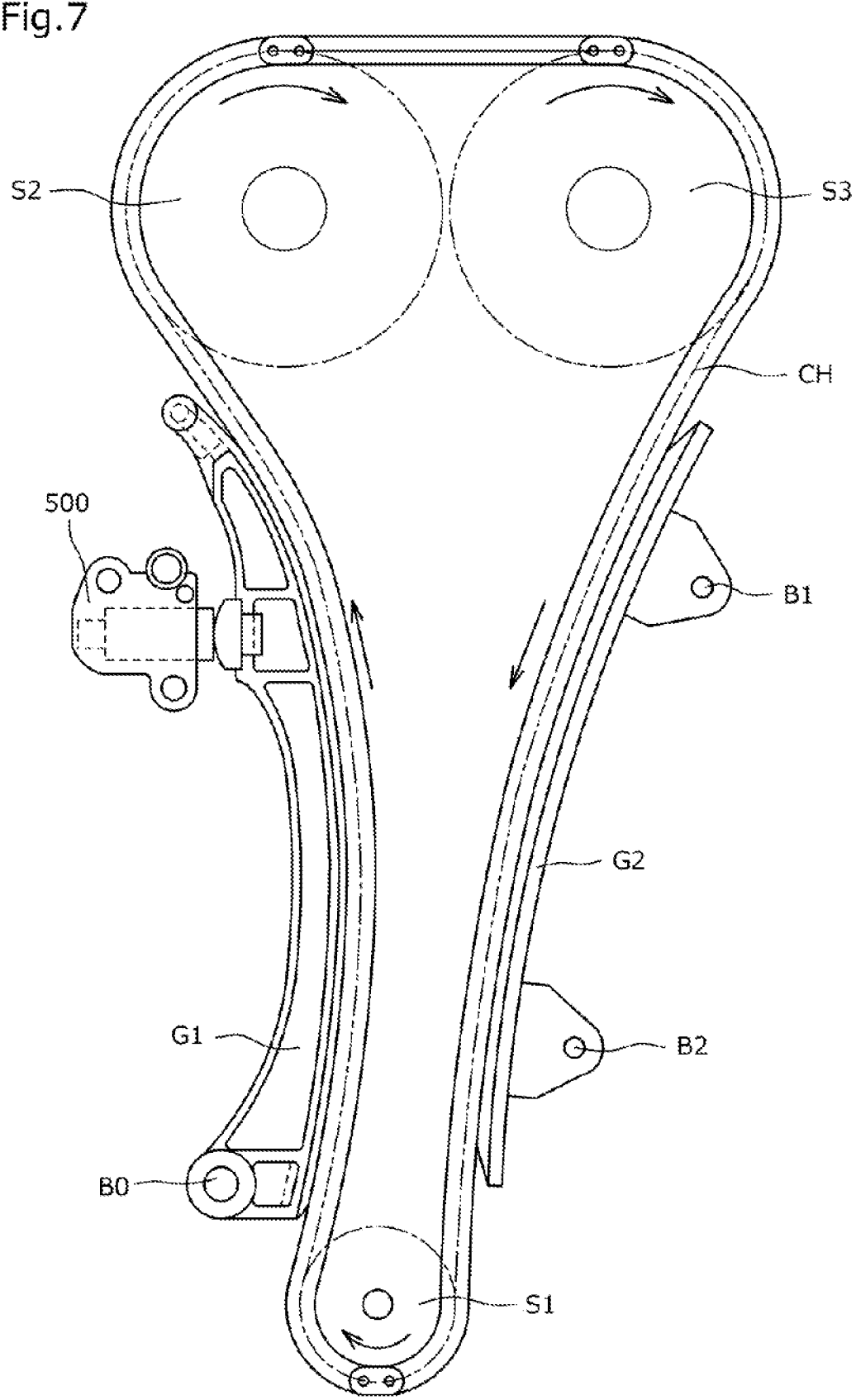
FIG. 7 is an explanatory view of a chain tensioner 500 used in the chain guide mechanism of an engine.
Figure 8:
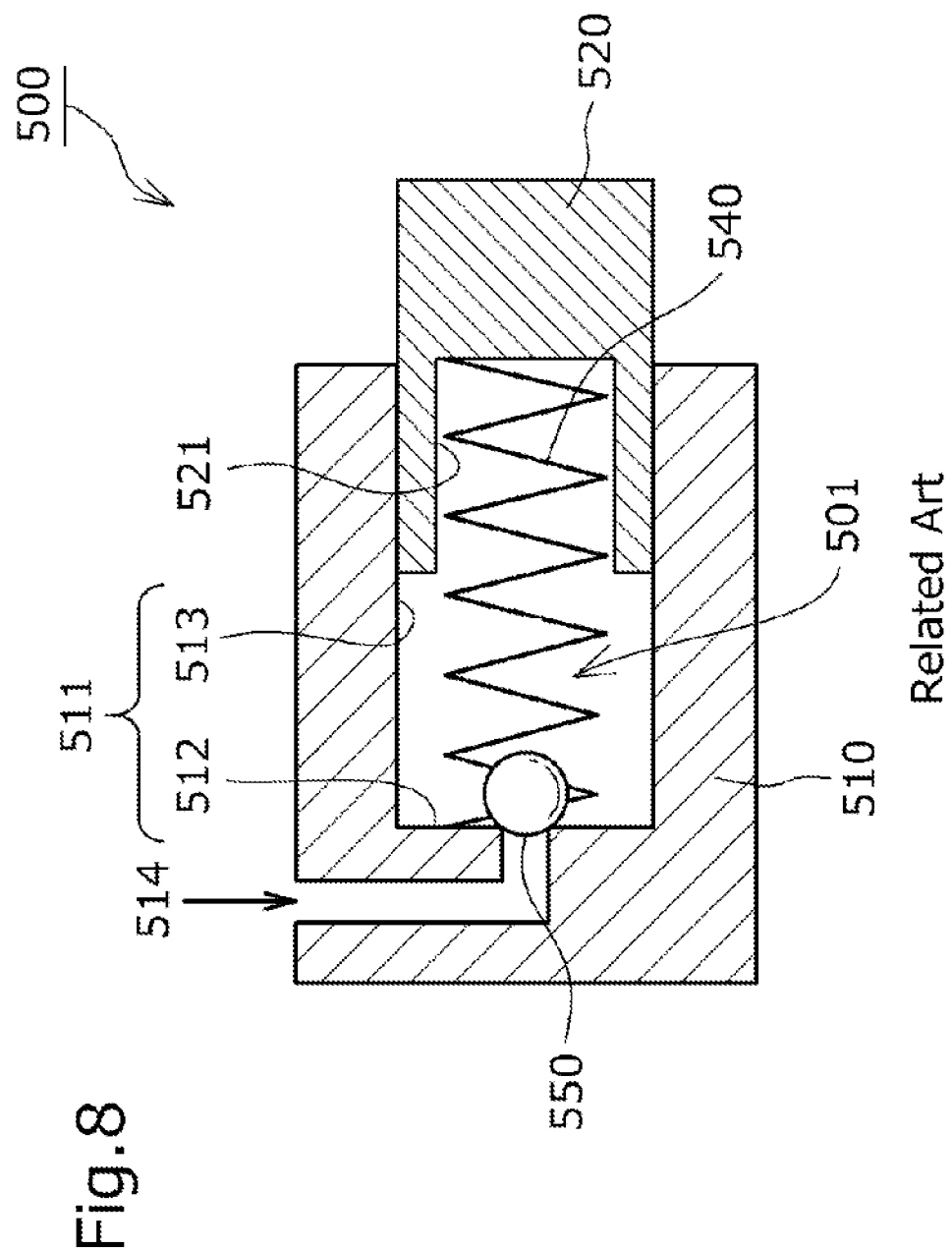
FIG. 8 is a schematic explanatory view of the conventional chain tensioner 500.

Next, the operation of the variable leak-down mechanism 230 of the chain tensioner 200 will be described using FIGS. 5 and 6.

First, by the damping of the plunger 220, oil is subjected to a force in a direction in which the oil is pushed out from the oil leak path 215 to the outside of the plunger 220.

On this occasion, since the flow path of the oil leak path 215 is narrowed down by the first leak groove 234 of the movable piece 233, it is possible to adjust the leak amount of the oil and maintain proper damping characteristics.

Here, when the viscosity of the oil changes with a change in oil temperature, the proper damping characteristics may not be obtained due to the excessive leak of the oil if the flow path inside the oil leak path 215 is narrowed down in the same manner as that before the oil temperature changes.

However, the temperature-dependent deformation member 231 of the variable leak-down mechanism 230 extends to its prescribed length with a change in the oil temperature to push the movable piece 233 to the side of the movable spring 232, and that the second leak groove 235 having a flow path narrower than that of the first leak groove 234 is moved to communicate with the oil leak path 215. In this manner, it is possible to reduce the leak amount of the oil and obtain the proper damping characteristics the same as that before the temperature changes.

Note that the oil leaks from the side of the tip end of the plunger 220 in the chain tensioner 200. Therefore, it is possible to directly add the oil leaking from the plunger 220 to the side of a shoe and effectively use the same to smoothen a chain.

The embodiments of the present invention are described above. The present invention is not limited to the above embodiments, but various design modifications may be made without departing from the scope of the present invention described in claims.

It is described in the above embodiments that the movable piece passage hole including the variable leak-down mechanism is connected to the oil leak path so as to cross the oil leak path. However, a method for providing the variable leak-down mechanism is not limited to this. For example, the variable leak-down mechanism may be provided so as to be contained in the oil leak path, or the movable leak-down mechanism may be connected to the exit of the oil leak path.

Further, it is described in the above embodiments that the variable leak-down mechanism is constituted by the movable piece, the movable spring urging the movable piece in the opening direction of the movable piece passage hole, the temperature-dependent deformation member urging the movable piece to the side of the movable spring, and the plug blocking the movable piece passage hole. However, the configuration of the variable leak-down mechanism is not limited to this. For example, the temperature-dependent deformation members each having different deformation temperature may be provided on both sides in the advancing/retracting direction of the movable piece without the provision of the movable spring, or the temperature-dependent deformation member may be provided on one side besides the movable spring provided in the advancing/retracting direction of the movable piece.

Further, it is described in the above embodiments that the first leak groove formed into a circumferential shape and the second leak groove having a groove shape different from that of the first leak groove are provided on the surface of the movable piece, and that the leak grooves communicating with the oil leak path are changed to adjust the leak amount of the oil when the position of the movable piece changes with a change in oil temperature. However, a method for adjusting the leak amount of the oil is not limited to this. For example, the first leak groove and the second leak groove may simultaneously communicate with the oil leak path to adjust the leak amount of the oil according to a change in oil temperature, or one wide leak groove may be provided to adjust the width of a mouth where the oil leak path and the leak groove communicate with each other according to a change in oil temperature.

Further, it is described in the above embodiments that the leak grooves are formed into a circumferential shape on the surface of the movable piece. However, a method for forming the leak grooves is not limited to this. For example, an oil leak hole penetrating the movable piece may be provided, or linear leak grooves communicating with the oil leak path may be provided on both end surfaces in the advancing/retracting direction of the movable piece.

What is claimed is:

1. A chain tensioner comprising:
a tensioner body having a cylindrical plunger accommodation hole and having an opening at one end;
a cylindrical plunger slidably inserted into the plunger accommodation hole; and
an urging unit flexibly accommodated in a pressure oil chamber formed by the plunger accommodation hole and the plunger and urging the plunger in a forward projection direction, wherein
the pressure oil chamber is provided with an oil leak path communicating with an outside of the chain tensioner,
the oil leak path contains a movable piece which is movable with a temperature-dependent deformation member that deforms according to oil temperature, and
the movable piece is formed into a shape that changes flow path resistance of the oil leak path according to a position to which the movable piece is moved.

2. The chain tensioner according to claim 1, wherein
the movable piece is accommodated to be slidable inside a movable piece passage hole provided to cross the oil leak path, and
the temperature-dependent deformation member is inserted inside the movable piece passage hole on at least one side of the movable piece.

3. The chain tensioner according to claim 1, wherein
the oil leak path is provided in the tensioner body and formed to communicate with the outside of the chain tensioner from the plunger accommodation hole.

4. The chain tensioner according to claim 1, wherein
the oil leak path is provided on a forward side of the plunger and formed to communicate with the outside of the chain tensioner from an inside of the plunger.

* * * * *